United States Patent [19]

Naka et al.

[11] Patent Number: 5,056,964

[45] Date of Patent: Oct. 15, 1991

[54] MACHINING APPARATUS

[75] Inventors: Hirokazu Naka; Tadashi Hayasaka, both of Iwata, Japan

[73] Assignee: Yamaha Hatsudoki Kabushiki Kaisha, Iwata, Japan

[21] Appl. No.: 320,104

[22] Filed: Mar. 6, 1989

[30] Foreign Application Priority Data

Jan. 28, 1988 [JP] Japan ................................. 63-15856

[51] Int. Cl.$^5$ ............................................ B23B 39/20
[52] U.S. Cl. ........................................ 408/35; 408/67; 408/69; 408/127; 408/72 R; 408/130; 901/6; 29/563; 29/41
[58] Field of Search .................. 408/35, 130, 88, 141, 408/103, 13, 127, 72 R, 71,-3, 72 R, 31, 34, 67, 69, 70; 29/40-42, 26 A, 38 A, 38 B, 563, 564; 901/6, 16, 41; 414/917; 409/203, 229, 235, 224, 225

[56] References Cited

U.S. PATENT DOCUMENTS

| 1,671,354 | 3/1928 | De Leeuw | 29/38 A |
| 2,685,122 | 8/1954 | Berthiez | 408/35 X |
| 3,621,753 | 11/1971 | Gladoske | 269/43 X |
| 4,090,281 | 5/1978 | Hautau | 408/35 X |
| 4,545,106 | 10/1985 | Juengel | 408/12 X |
| 4,664,570 | 5/1987 | Tsukiji et al. | 409/224 X |
| 4,844,678 | 7/1989 | Schenk | 29/568 X |

FOREIGN PATENT DOCUMENTS 748420 5/1986 United Kingdom ............... 29/38 A

Primary Examiner—Larry I. Schwartz
Assistant Examiner—R. Schultz
Attorney, Agent, or Firm—Ernest A. Beutler

[57] ABSTRACT

A machining apparatus for machining a work piece wherein the work piece is held above the work stations of the machine tool base so that chips will fall downwardly during machining operations. The tools are successfully indexed to the work station so that chip removal need be accomplished only at a single place and to make the arrangement more compact.

5 Claims, 6 Drawing Sheets

MACHINING APPARATUS

BACKGROUND OF THE INVENTION

This invention relates to a machining apparatus and more particularly to an improved apparatus for automatically machining a work piece.

A wide variety of automatic machining apparatus have been proposed. For the most part, these devices consist of a support or table on which a work piece is carried and a machine tool or plurality of machine tools which are positioned either above or to one side of the support and which perform machining operations on the work piece. This type of apparatus is normally utilized in conjunction machining devices such as castings and can perform a wide variety of machine operations on them. Generally, the casting is supported on a work table which may be movable in the X and Y directions and also which may be rotated about an axis that extends in the Z direction. A variety of machine tools are supported above or to one side of the work table and perform the machining operation. For example, turret lathes, gang drills or the like may be provided for performing the machining operations. Alternatively, an industrial robot may be supported above the work table and it may carry a variety of tools for performing the machining operations.

Although this type of device has great utility, it also has a number of disadvantages. For example, because of the fact that the machining operations are generally performed from above, chips cut by the machining operation have a tendency to fall back into the work piece and can cause damage. Alternatively, the chips will fall upon the supporting bed, and must be removed. In either event, it is necessary to provide either a source of compressed air or a cutting and washing liquid which will flush the chips away from the machined surface so as to provide a clean environment. However, this arrangement generally causes enlargement of the machine tool and specifically the supporting base since the machining operations can be performed at any of a wide variety of locations relative to the base.

It is, therefore, it is a principle object of this invention to provide an improved machining apparatus.

It is a further object of this invention to provide a machining apparatus wherein a work piece is machined and the chips cut from the work piece will fall away from it rather than into it.

It is a further object of this invention to provide a machining apparatus wherein the chips will all be located in generally the same area so as to afford a more compact arrangement and one in which the chips cannot damage the work piece.

It is a further object of this invention to provide an improved, compact and simplified arrangement for performing a plurality of machining operations on a work piece.

SUMMARY OF THE INVENTION

This invention is adapted to be embodied in a machining apparatus for performing machining operations on a work piece. The apparatus includes gripping means for holding a work piece and displacement means that are operative to move the gripping means for movement. A machine tool base carries at least one machine tool for performing a machining operation. In accordance with the invention, means are provided for operating the displacement means so that the work piece will be positioned above the machine tool when the machining operations are being performed.

DETAILED DESCRIPTION OF THE PREFERRED EMBODIMENT OF THE INVENTION

Figure 1:
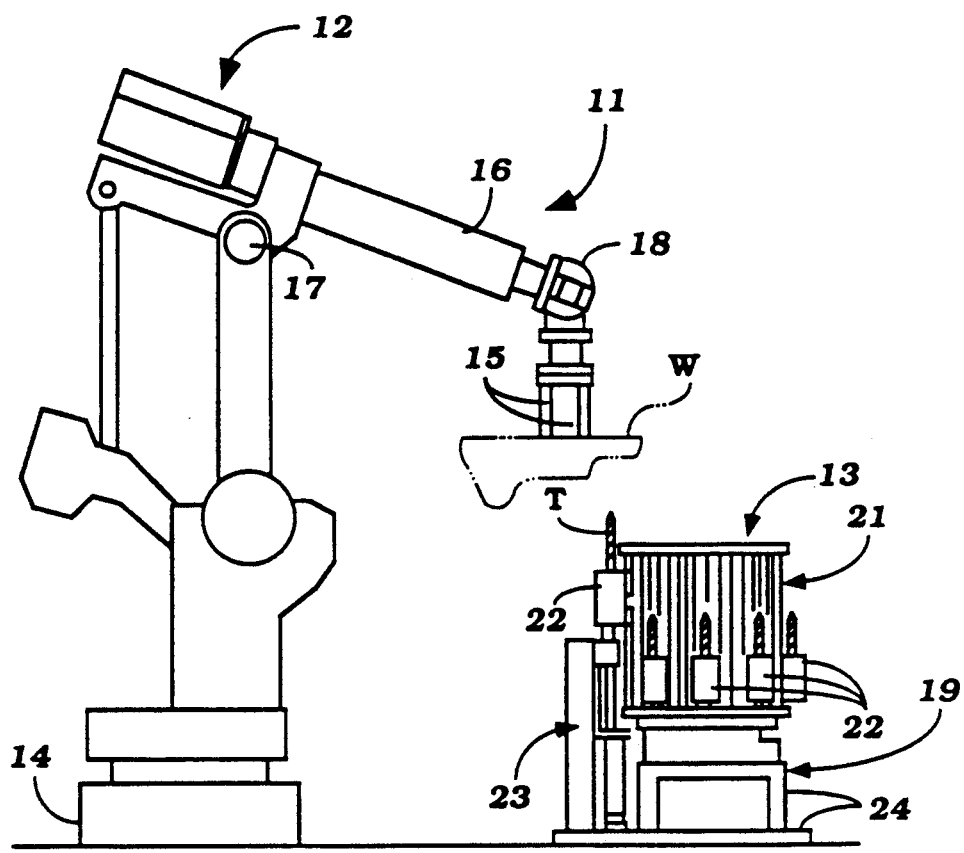
FIG. 1 is a side elevational view of a machining apparatus constructed in accordance with an embodiment of the invention.
Figure 2:
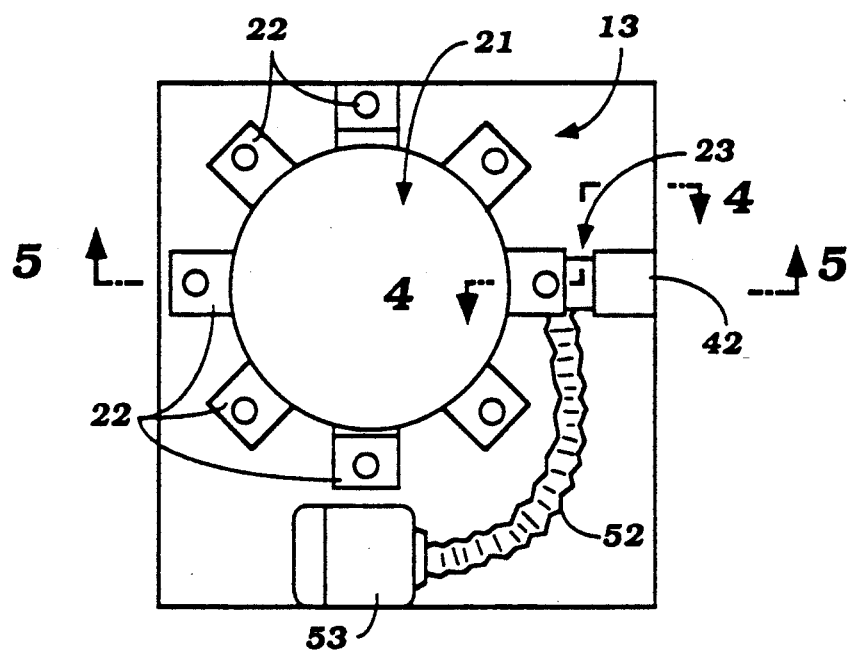
FIG. 2 is a top plan view of the machine tool.
Figure 3:
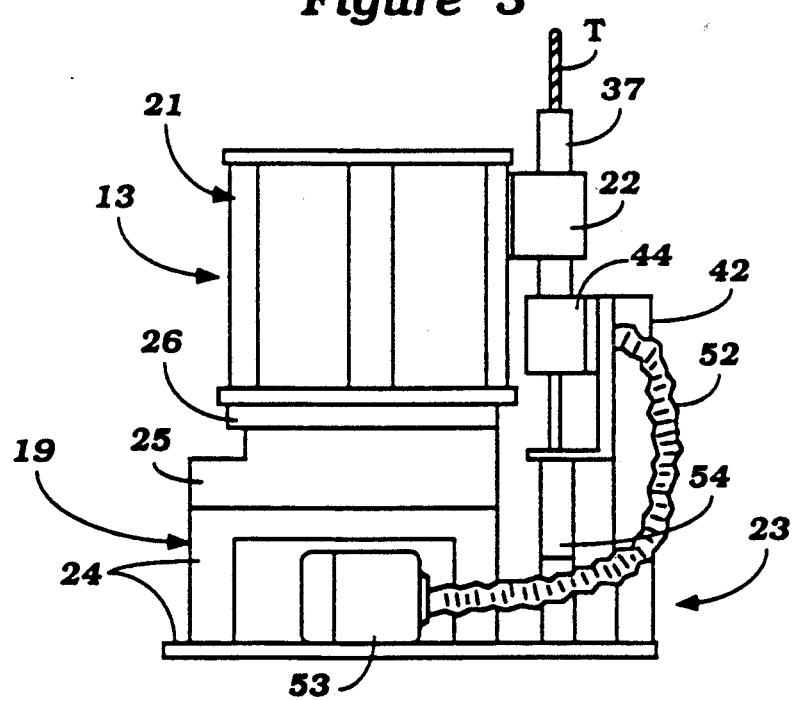
FIG. 3 is a side elevational view of the machine tool.
Figure 4:
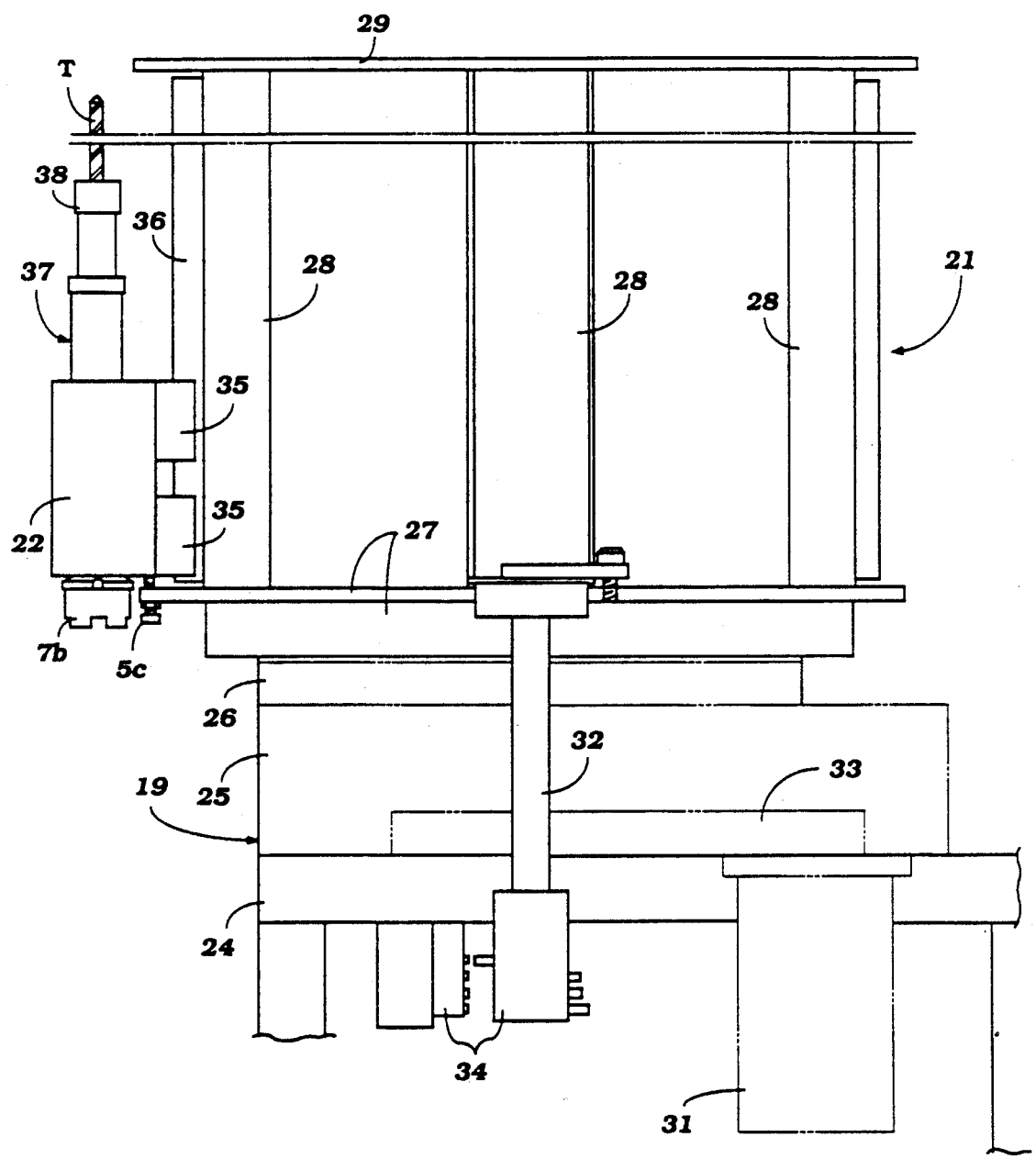
FIG. 4 is a still further enlarged side elevational view of the machine tool, with portions shown in phantom and other portions broken away.
Figure 5:
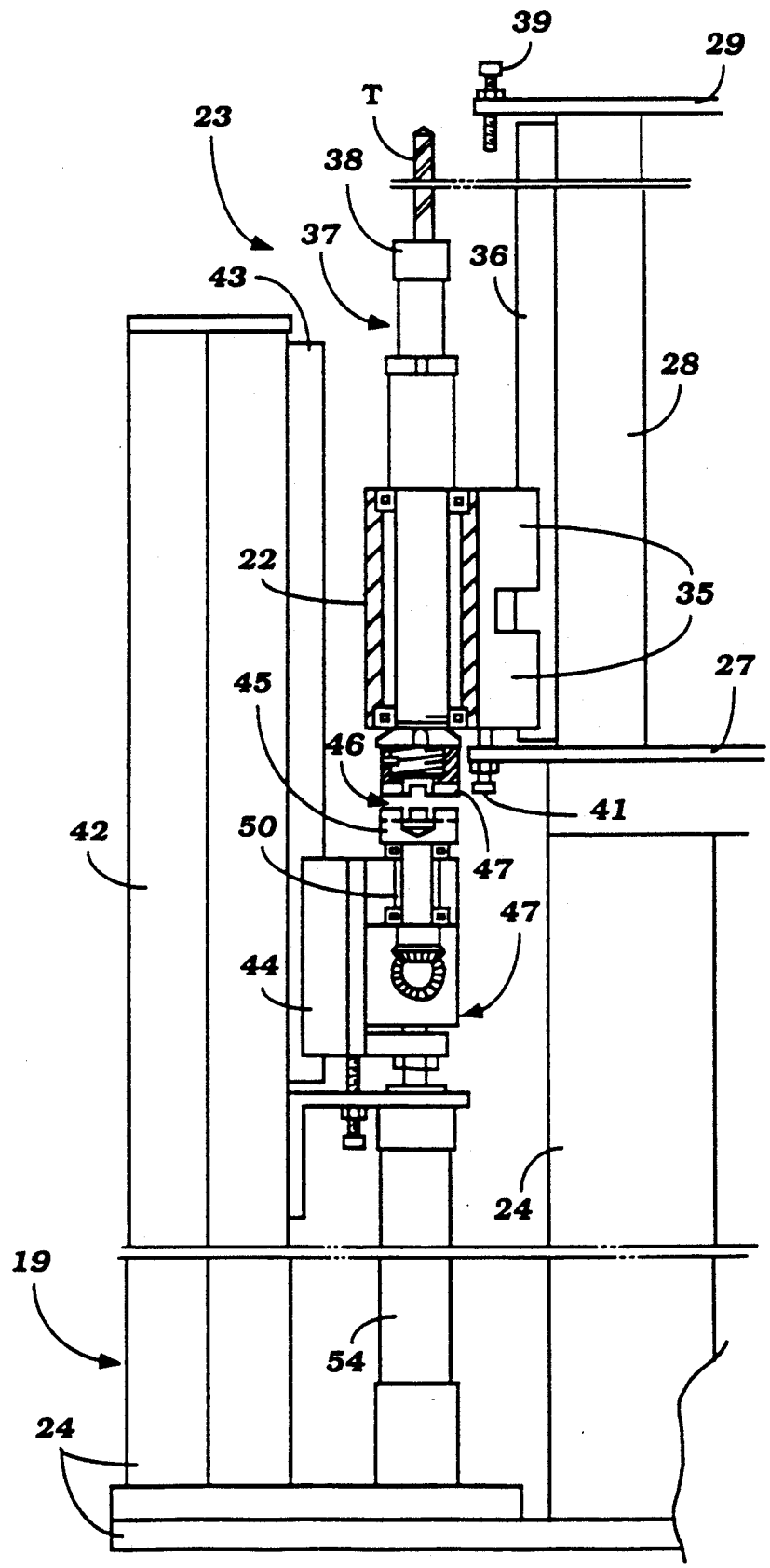
FIG. 5 is a still further enlarged side elevational view showing the drive arrangement for the machine tools, with portions shown in sections.
Figure 6:
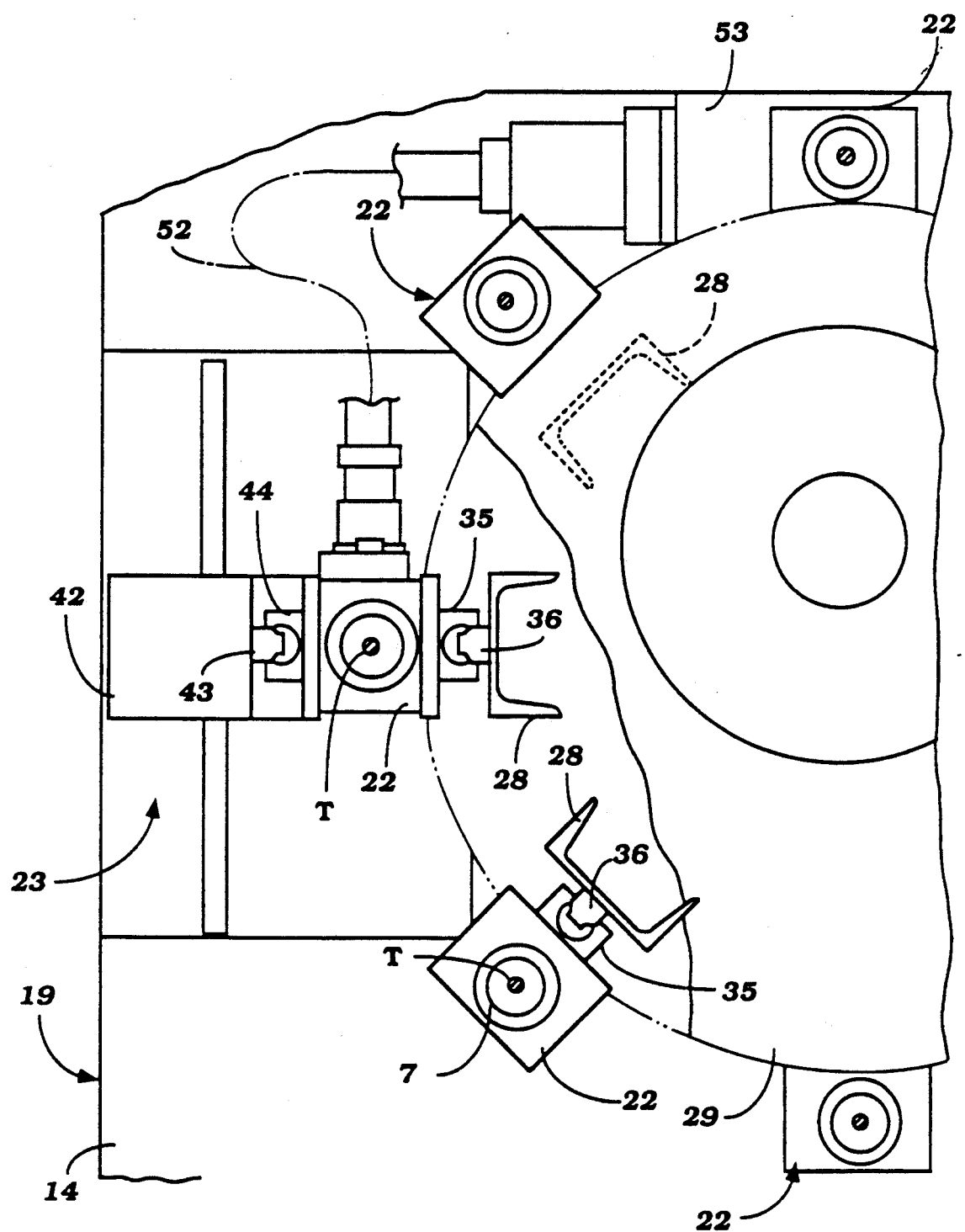
FIG. 6 is a further enlarged partial top plan view showing the machine tool.

Referring first primarily to FIG. 1, a machining apparatus constructed in accordance with an embodiment of the invention is identified generally by the reference numeral 11. The machining apparatus 11 is comprised of an industrial robot, indicated generally by the reference numeral 12, and a machine tool, indicated generally by the reference numeral 13.

The industrial robot 12 is comprised of a base 14 that is disposed adjacent to the machine tool 13 and which carries a gripping device in the form of a gripper 15. The gripper 15 is supported on an arm 16 of the industrial robot 12 in a suitable manner and is supported by a displcement means for movement in a plurality of planes and directions. That is, the arm 16 can be rotatable about a vertically extending axis defined by the base 12, the arm 16 may be pivotal about a horizontally disposed axis 17 in addition to this rotation and may be telescopic. In addition, the gripping means 15 is carried at this end of the arm 16 by means of a universal joint assembly 18 that permits both rotational and pivotal movement. As a result, a work piece W gripping by the gripping means 15 may be moved from a remote station or conveyor to a position in proximity to the machine tool 13, as will become apparent.

As may be seen in FIG. 1, the work piece W is positioned by the gripping device and its control and displacement mechanism so that it will be disposed above the machine tool 13. In this way, machining operations performed on the work piece W will cause chips to be removed that will fall downwardly and away from the work piece W so that additional flow of cutting fluids and/or compressed air is not required to remove chips from the work piece W that are generated by the machining operations.

The machine tool 13 is comprised of a base 19 that supports a turret 21 for rotation above a vertically extending axis. A plurality of machine tools 22 are slidably supported on the turret 21 for movement between a retracted position and an extended position. A drive mechanism, indicated generally by the reference numeral 23 is supported at one side of the base 19 and is operative to both elevate the machine tool 22 which registers with it and to drive a tool T supported thereby.

The machine tool 13 will be described in more detail by reference to the remaining figures.

The base 19 is comprised of a frame 24 that may be a weldment or casting and which supports a support plate 25 and rotatable table 26. The turret 21 is comprised of a frame assembly comprising a lower frame plate 27 that is affixed to the table 26 and carries a plurality of upstanding support channels 28. The upper ends of the support channels 28 are affixed to a top plate 29 so as to provide a rigid assembly.

The turret 21 is rotatably driven by a drive motor 31 carried within the base 19 and which drives a driving shaft 32 that is journaled within the base 19 via a Geneva gear or other intermittent drive mechanism 33. A sening assembly 34 determines which of the machine tools 22 has been indexed to the work station by the indexing mechanism 33. The indexing mechanism 33 is shown in phantom lines since any of the known indexing mechanisms utilized for this purpose can be incorporated.

The machine tools 22 are provided with guides 35 that are supported upon ways 36 that are affixed to the outside peripheral edges of the channels 28. This provides sliding support for the machine tools 22 along the turret 21 in a direction parallel to the axis of rotation. The individual machine tools 22 may be of any known type and in the illustrated embodiment each machine tool comprises a drill 37 having a chuck 38 that receives the tool T. There are provided upper and lower limit stops 39 and 41 carried by the turret 21 for limiting the extreme upper and lower movement of the tools 22 on the ways 36.

As has been noted, a single driving and elevating mechanism 19 is provided for operating and driving each of the machine tools 22 when the indexing mechanism 33 presents such machine tool to the work station. This mechanism includes an elongated upstanding support post 42 that is affixed to the base 19 adjacent the work station. This support post 42 provides a way 42 upon which guides 44 of the driving and elevating mechanism 23 is supported. This mechanism includes one element 45 of a dog clutching connection, indicated generally by the reference numeral 46 and which cooperates with a cooperating element 47, affixed to the lower end of the drive shaft of the tool 22.

Figure 7:
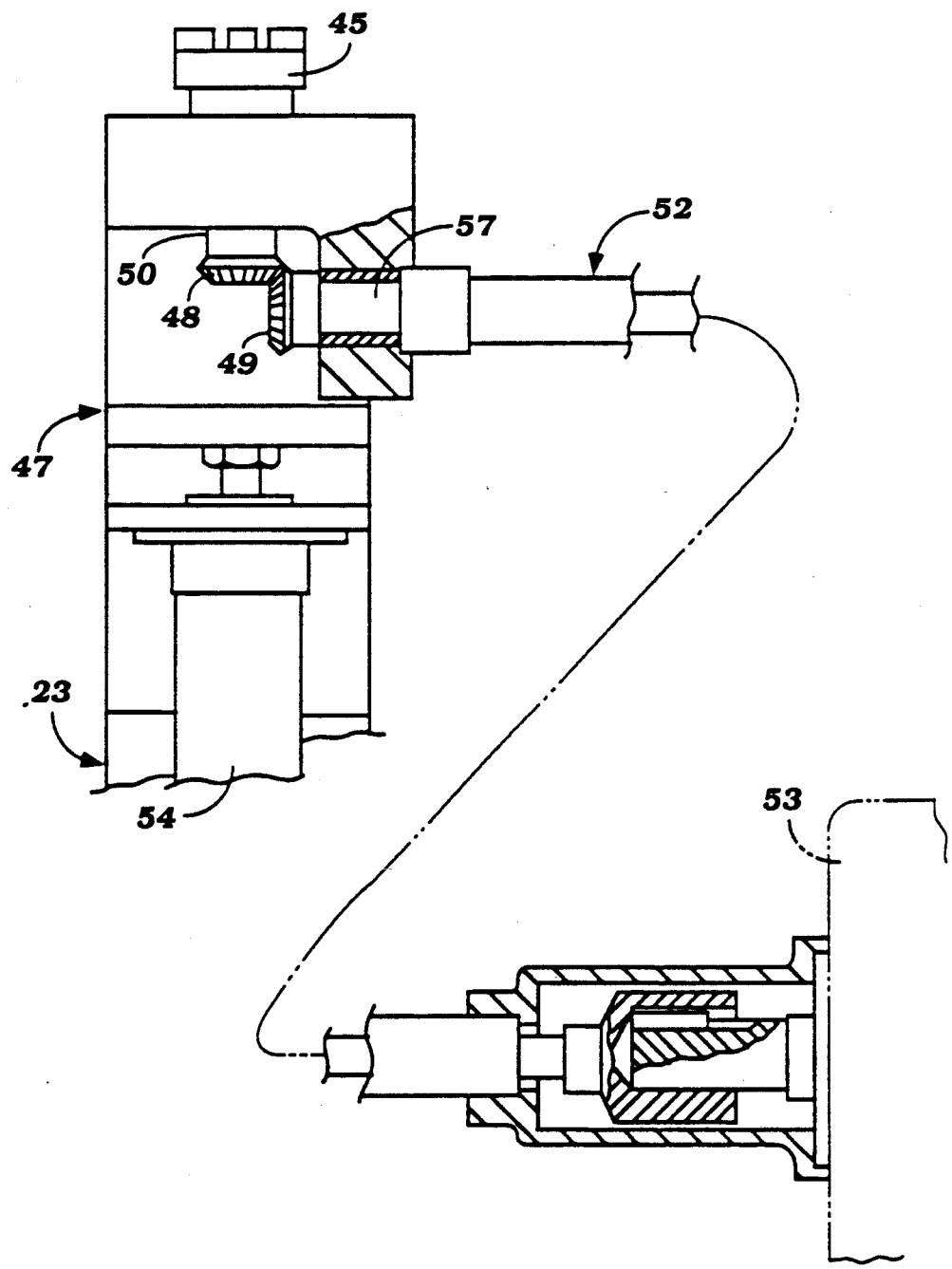
FIG. 7 is a partially schematic view, with portions shown in section, of the drive of the machine tool for driving the individual tools.

As may be best seen in FIG. 7, the coupling 45 is connected to a shaft 50 that is journaled in a number 47 to which the guide 44 is affixed. A bevel gear 48 is affixed to the lower end of the shaft 50 and meshes with a driving bevel gear 49 that is affixed to a shaft 51. The shaft 51 is driven by a flexible drive shaft 52 which is, in turn, coupled to a drive motor 53 that is mounted on the base 19. As a result, the flexible shaft 52 will permit the driving engagement of the tools 22 regardless of their axial position along the ways 36 once the coupling 46 is engaged.

The raising and lowering of the drive mechanism 47 is accomplished by means of a hydraulic cylinder 54 that is supported on the base 19 and which has its piston connected to the driving mechanism 47 for raising and lowering it.

OPERATION

It should be understood that the specific sequence of operations which will be described can be varied to specific applications. The specific sequence described, therefore, is only one of many which can be utilized in conjunction with this apparatus under the control of an appropriate computer system.

With all of the tools 22 retracted, the indexing mechanism 33, is operated so as to bring the appropriate tool 22 into registry at the work station. The robot 12 is then operated so as to position the work piece W in the appropriate location for the first machining operation. The motor 53 driving the drive mechanism 47 is then operated and the cylinder assembly 54 is actuated so as to raise the tool T and feed it into the work piece W to perform the machining operation. Once the machining operation is completed, the tool T is retracted by operation of the cylinder 54 at which time the drive coupling 46 will be automatically disengaged. The turret 21 is then indexed to the next work station and the aforenoted cycle is repeated.

It should be readily apparent, therefore, that the device is highly effective in achieving its intended purpose and the arrangement can be quite compact and without necessitating the provision of substantial chip removal from the work piece due to the fact that the work piece is suspended above the tool and the above the single work station where in all machining operations are performed.

As should be readily apparent, the foregoing description is that of the preferred embodiment of the invention and various changes and modifications may be made without departing from the spirit and scope of the invention, as defined by the appended claims.

We claim:

1. A machining apparatus for performing machining operations on a work piece comprising gripping means for holding a work piece, a base adapted to be affixed to a horizontal surface, an upstanding member journaled upon said base for rotation about a vertical axis, an arm support pivotally mounted on said upstanding member about a horizontal axis, means mounting said arm on said arm support for movement with respect a universal joint carrying said gripping means and mounted to said arm, a machine tool base adapted to be affixed to the horizontal surface and carrying at least one machine tool for performing a machining operation, control means for controlling the pivotal movement of said arm and said upstanding member to position a work piece held by said gripping means in a location and desired orientation above said machine tool base and for operating said machine tool for performing a machining operation by said machine tool carried by said machine tool base upon the workpiece while supported solely by said gripping means and above said machine tool.

2. A machining apparatus for performing machining operations as set forth in claim 1 wherein the machine tool base carries a plurality of machine tools and indexing means for sequentially presenting the machine tools to a work station.

3. A machining apparatus for performing machining operations as set forth in claim 2 wherein said control means includes a single drive means carried by the base for driving the machine tool presented at the work station.

4. A machining apparatus for performing machining operations as set forth in claim 3 wherein said control means includes feed means for operating the machine tool at the work station into a feeding mode.

5. A machining apparatus as set forth in claim 1 wherein the control means controls the telescopic movement of the arm.

* * * * *

UNITED STATES PATENT AND TRADEMARK OFFICE
CERTIFICATE OF CORRECTION

PATENT NO. : 5,056,964
DATED : October 15, 1991
INVENTOR(S) : Naka, et al

It is certified that error appears in the above-identified patent and that said Letters Patent is hereby corrected as shown below:

Column 4, line 38, Claim 1, after "respect" insert --thereto,--.

Signed and Sealed this

Twentieth Day of July, 1993

Attest:

MICHAEL K. KIRK

*Attesting Officer*     *Acting Commissioner of Patents and Trademarks*